(12) United States Patent
Burns

(10) Patent No.: US 10,228,020 B1
(45) Date of Patent: Mar. 12, 2019

(54) LINEAR BEARING APPARATUS AND METHOD OF USE

(71) Applicant: Gregory Lee Burns, Minden, NV (US)

(72) Inventor: Gregory Lee Burns, Minden, NV (US)

( * ) Notice: Subject to any disclaimer, the term of this patent is extended or adjusted under 35 U.S.C. 154(b) by 0 days.

(21) Appl. No.: 15/824,550

(22) Filed: Nov. 28, 2017

Related U.S. Application Data

(60) Provisional application No. 62/589,808, filed on Nov. 22, 2017.

(51) Int. Cl.
*F16C 29/04* (2006.01)
*F16C 29/06* (2006.01)
*F16C 35/04* (2006.01)

(52) U.S. Cl.
CPC ........ *F16C 29/0692* (2013.01); *F16C 35/042* (2013.01)

(58) Field of Classification Search
CPC ...... F16C 29/04; F16C 29/043; F16C 29/045; F16C 29/048; F16C 29/0692
USPC ....................................... 384/50, 53
See application file for complete search history.

(56) References Cited

U.S. PATENT DOCUMENTS

| | | | | |
|---|---|---|---|---|
| 2,907,610 | A | * 10/1959 | Wise | ..................... F16C 29/045 384/55 |
| 29,076,101 | | 10/1959 | Wise | |

FOREIGN PATENT DOCUMENTS

| | | | | |
|---|---|---|---|---|
| DE | 4405513 A1 | * 8/1995 | ............... | G01B 7/02 |
| FR | 2527965 A1 | * 12/1983 | ............. | B23Q 1/262 |

OTHER PUBLICATIONS

John's Model Making; Building the Manual Pick and Place Machine; Jul. 5, 2014.
Attempt Zero: Casting a crude HBLB and machining it to death!; First Attempt; http://www.buildyouridea.com/cnc/hblb/phase0/phase0.html.
Junkhack; Thingiverse; D-Slot (Diagonal V-Slot); Jan. 1, 2017.
Smferrari; Thingicerse; sliding, for rectangular sections; Jul. 22, 2013.
Prior Art; Linear Bearings for Square Sections.

* cited by examiner

*Primary Examiner* — Phillip A Johnson
(74) *Attorney, Agent, or Firm* — Holland & Hart LLP

(57) ABSTRACT

A grooved linear bearing having a plurality of relatively rigid, laterally extending side plates and multiple sets of one or more circumferentially grooved bearings mounted laterally along and between adjacent side plates. One or more rod or tube corners or edges can penetrate mating peripherally grooved bearings, providing rotational stability for the rod mounted within the bearing; and inclusion of laterally spaced sets of such groove bearings (i.e., laterally along the linear bearing axis) can provide transverse (side-to-side) stability of the rod when slidably mounted within the linear bearing.

26 Claims, 9 Drawing Sheets

LINEAR BEARING APPARATUS AND METHOD OF USE

CROSS REFERENCE TO RELATED APPLICATION

This application claims priority through the applicant's prior provisional patent application bearing the same title, Ser. No. 62/589,808, filed Nov. 22, 2017, which provisional application is incorporated by reference in its entirety.

FIELD OF TECHNOLOGY

A linear bearing apparatus and method of use for slidably supporting a polygonal or edge-bearing tube or rod.

BACKGROUND OF SOME ASPECTS OF THE SPECIFICATION

Linear bearings have long existed for supporting a tube or rod, most commonly a tube or rod having a tubular outer periphery, to slide linearly within or along the bearing. One common prior art bearing has a sets of roller bearings mounted between angled linearly extending braces. The roller bearings have rounded circumferential edges adapted to abut the external periphery of the tube or rod slidably mounted within the linear bearing, and in the case of a square tube or rod (i.e., having a square cross-section), the sets roller bearings similarly abut the planar sides of the square rod so that the square rod may slide within the linear bearing.

This linear roller bearing type of prior art often does not sufficiently secure the polygonal tube or rod from responding to external forces on the rod by rotating at least somewhat about the axis of the rod. Similarly, these type of prior art bearings also often do not sufficiently prevent the tube or rod from responding to external force by moving laterally (to the side with respect to the rod axis) intermediate the locations of the roller bearings spaced about the axis of the linear roller bearing. These issues are particularly problematic in heavy duty environments.

Another type of linear bearing utilizes V-groove bearings mounted to a single laterally extending triangular plate (i.e., extending parallel to a central linear axis of the bearing) or a single relatively narrow bracket transverse to the axis of the rod that may slide with respect to the linear V-groove bearing. These types of V-groove linear bearings are typically used to slide along a fixed rectangular or other tube or rod with the V-groove edge of the bearings slidable along two to four external corners on the tube rod extending parallel to the axis of the rod.

These types of V-groove linear bearings do not provide sufficient structural strength to prevent a non-fixed tube or rod, particularly a heavy-duty tube rod, from rotating around the linear bearing axis, or from moving side to side with respect to the linear bearing or its axis. Thus, they have typically not been used to support a tube or rod that slides with respect to the linear bearing and the linear bearing is the structure that maintains the sliding rod in position rotationally and side-to-side with respect to the linear bearing or its axis.

Yet another type of prior art linear bearing, shown in U.S. Pat. No. 2,907,761, provides an outer fixed tube housing with two opposed bearing mounting brackets mounted to, and extending laterally along, the interior of the fixed tube housing. The opposed bearing mounting brackets cooperatively provide four parallel U-shaped channels extending laterally along the brackets within the fixed tube housing, and multiple sets of two opposed V-groove bearing assemblies mounted along the laterally extending the U-shaped channels. Four corners extending outwardly from a linearly sliding rod penetrate the V-groove slots in the bearings. Although this V-groove linear bearing secures the rod in slidably in position rotationally and side-to-side with respect to this linear bearing, this bearing has a complex structure that is difficult and relatively expensive to manufacture and is bulky, heavy, and costly to ship.

SUMMARY OF SOME ASPECTS OF THE SPECIFICATION

The applicant believes he has discovered the issues with existing linear bearings explained in the Background section supra. The applicant has therefore developed a grooved linear bearing having a plurality of relatively rigid, laterally extending side plates and multiple sets of one or more peripheral groove bearings mountable laterally along and between adjacent side plates.

In some embodiments, some or all of the linear bearing components can be provided in broken-down or kit format. Some such formats can provide stackable side plates and sets of V-groove bearing components and mounting components that can be one or more among being easy to manufacture, ship, assemble, and ship.

Certain instances utilize disk bearings mountable transverse to the axis of the V-groove linear bearing. In some applications, the disk bearings are disk bearing assemblies of one or more bearing disks mounted transversely to, and rotatably about, a central bearing rod or bolt secured to adjacent bearing side plates. Some embodiments of the disk bearings are formed of two opposed bearing disks having angled outer edges, the two opposed outer edges cooperatively yielding the V-grooves in the disk bearings.

Some embodiments of the bearing side plates have a central generally rectangular plate section with opposed plate edge sections extending for the rectangular plate section at an obtuse angle to a planar outer surface of the rectangular plate section. In some applications, the side plates have a cup- or bowl-like cross-section, provide one or more of stackability of the plates on each other, and mounting arms or sections, via the plate edge sections, for mounting grooved bearings rotatably transverse to a linear bearing axis extending through the interior of the grooved linear bearing.

Some applications can provide a rigid, laterally extending linear bearing for use with a polygonal or externally, laterally-edged tube or rod slidably penetrating the interior of the linear bearing. One or more tube or rod corners or outwardly-protruding edges can penetrate mating peripherally grooved bearings, providing rotational stability for the tube or rod mounted within the bearing; and inclusion of laterally spaced sets of such groove bearings (i.e., laterally along the linear bearing axis) can provide transverse (side-to-side) stability of the rod when slidably mounted within the linear bearing.

In some embodiments, one or more side plates can include one or more angled bearing rod mounting channels in a plane transverse to the linear bearing axis with one end of the channel closer than the opposed channel end to the linear bearing axis. Such an angled bearing mounting channel can allow a disk bearing assembly to be mounted at varying distance from the linear bearing axis, in turn allowing adjustment of the location of a groove bearing mounted about the bearing rod to be moved and adjusted with respect to the bearing axis and associated slidable rod or tube corner or edge.

Some applications can include, in addition or alternatively, a one or more grooved bearing adjustment slots penetrating an edge of a side plate, or multiple such one or more slots in multiple side plate edges. Such an adjustment slot can be located adjacent a groove bearing mounted in a side plate so that an end of a lever tool can be inserted into the adjustment slot to lever and push one side of the slot with respect to the other, in order to in turn adjust the location of the adjacent groove bearing inward into the interior of the linear bearing and/or toward a tube or rod corner or outer edge slidably mounted within the linear bearing.

Certain embodiments of the grooved linear bearing have two or more stackable (in some applications, three, four, or more), optionally identically-formed and configured, rigid side plates, and a plurality of sets of one more V-groove disk bearing assemblies, with each such assembly having opposed, mating bearing disks, having opposed angled circumferential edges, mountable to abut each other about a bearing rod securable to a one or more (in some applications, any) of the rod mounting passages in one or more (in some applications, all) side plates of the linear bearing. In some embodiments, one or more bearing rods may be a threaded bolt threadable to a mating bolt nut, and the bearing rod assemblies may include washers as desired, such as intermediate the bolt head and side plate and bolt nut and side plate.

Some instances of the grooved linear bearing of this specification can therefore provide one or more of:

- V-grooved bearings to provide a substantial and strong linear bearing that secures up to heavy-duty polygonal tube or rod structure in linear position as such a tube or rod slides within the linear bearing;
- easily made thin, rigid side plates to provide bearing rigidity and prevent transverse and rotational movement of a polygonal or edged tube or rod with respect to its axis;
- spacing of grooved bearings about the linear bearing and with sets axially spaced from each other to provide rigidity;
- diagonal slots in the outer edges of the plates to provide adjustability of an adjacent grooved bearing and limitation of tube movement as desired within the grooved linear bearing;
- diagonal bearing mounting channels—neither parallel nor perpendicular to the tube axis—to provide easy precise clearance adjustment between the grooved bearings and the tube or rod;
- substantial, rigid linear bearing structure that is nevertheless relatively simple structurally and to manufacture, assemble, disassemble, use, and maintain;
- linear bearing side plates that are identical and stackable; and
- grooved disk bearings, which can comprise mating bearing disks, and bearing mounting bolts, nuts, and washers that are respectively identical, so that, among other things, the entire structure can be shipped easily in a knocked-down format and, if desired, in a relatively small shipping container.

There are other novel features and advantages of the present specification. They will become apparent as the specification proceeds. In this regard, the scope of the invention is to be determined by the claims as issued and not by reason of a feature or advantage being recited in the prior Background section or this Summary section.

BRIEF DESCRIPTION OF THE DRAWINGS

The inventor's preferred and other embodiments are disclosed in association with the accompanying Figures, in which.

DETAILED DESCRIPTION

The prior Brief Summary and the following description provide examples that are not limiting of the scope of this specification. One skilled in the art would recognize that changes can be made in the function and arrangement of elements discussed without departing from the spirit and scope of the disclosure. Various embodiments can omit, substitute, add, or mix and match various procedures or components as desired.

Figure 1:
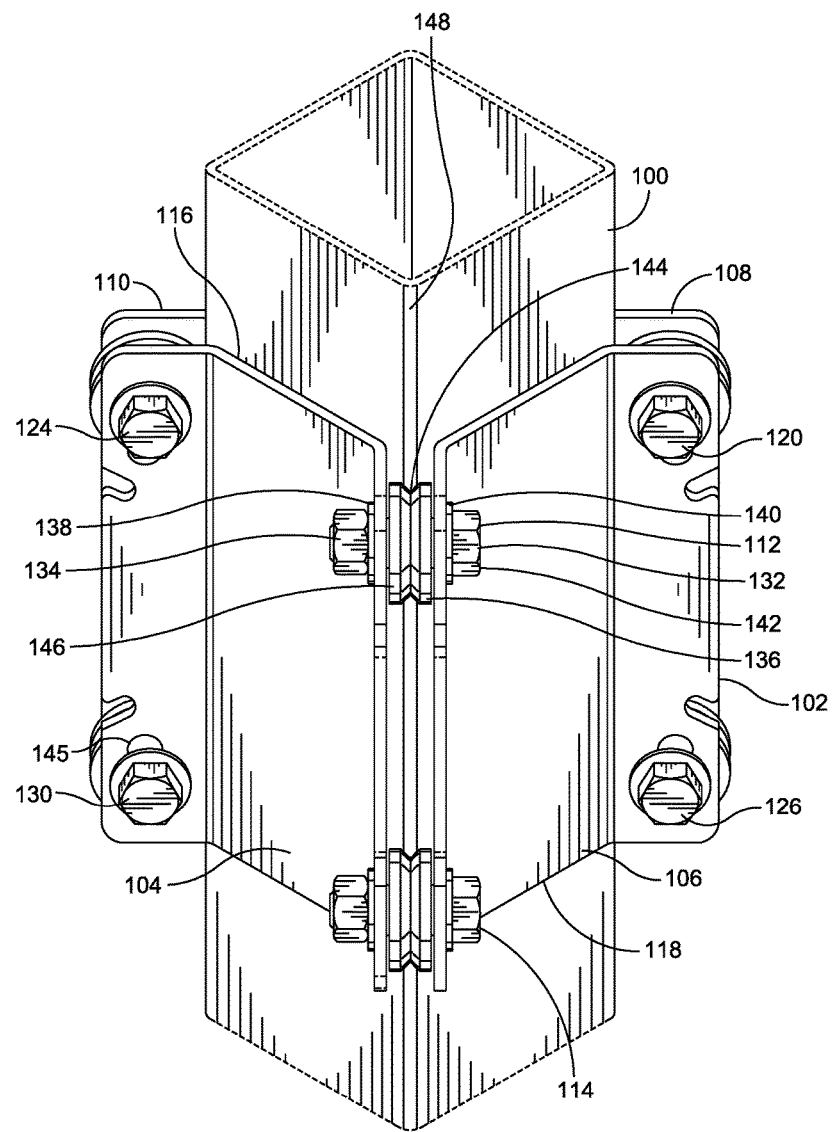
FIG. 1 is a perspective view of a grooved linear bearing having four identically-formed and identically-shaped side plates and two sets of four V-grooved bearing assemblies mounted spaced from each other, with each set adjacent a lateral end of the linear bearing to rigidly support and locate a heavy duty square metal tube slidably mounted with the linear bearing.

With reference now to FIG. 1, a square heavy-duty metal tube 100 is slidably but securely mounted within a matingly four-sided V-grooved linear bearing 102. The V-grooved linear bearing 102 has four identically formed and shaped side plates 104, 106, 108, 110 surrounding the square tube 100. Each pair of adjacent side plates, e.g., 104, 106, has two bearing assemblies, e.g., 112, 114, mounted between them 104, 16, with one bearing assembly 112 mounted adjacent one lateral end 116 of the linear bearing 102 and the second bearing assembly 114 mounted adjacent the opposed lateral end 118 of the linear bearing 102. Thus, adjacent the one lateral end 116 of the linear bearing 102 is a first set of four bearing assemblies 112, 120, 122 (not shown in FIG. 1), 124 and adjacent the opposed lateral end 118 of the linear bearing is a second set of four bearing assemblies 114, 126, 128 (not shown in FIG. 1), 130.

Each bearing assembly, e.g., 112, has a central bolt 132 threaded to an opposed bolt nut 134, a V-grooved disk bearing 136 rotatably mounted about the central bolt 132, and opposed washers 138, 140, with one 140 washer abutting the bolt head 142 and the second, opposed washer 138 abutting the bolt nut 134. Each bearing assembly, e.g., 112, is mounted within a mating bolt channel 145 and secured within the bearing assembly's associated bolt channel so that the circumferential V-groove, e.g., 144, in the outer circumferential edge, e.g., 146, of the disk bearing, e.g., 136, firmly abuts the mating corner, e.g., 148, of the steel tube 100.

Figure 2:
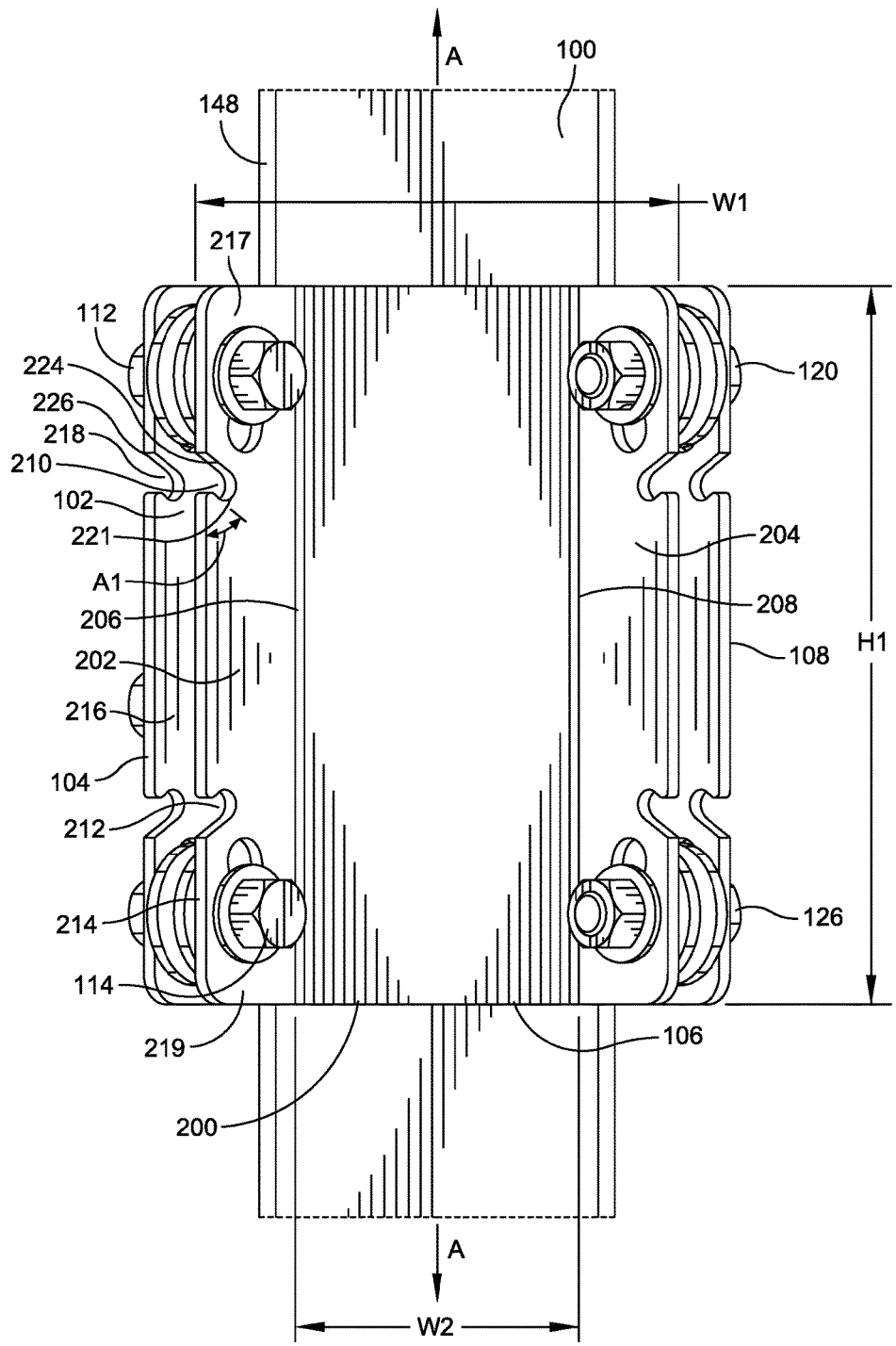
FIG. 2 is an elevational view of the grooved linear bearing and square metal tube of FIG. 1.

With reference now to FIG. 2, each side plate, e.g., 106, laterally extends along, and is parallel to, the central laterally extending axis A-A running through the axial center of the square tube 100 and linear bearing 102. Each side plate, e.g., 106, also a central planar rectangular section 200 intermediate two opposed laterally extending generally planar edge sections 202, 204, which extend away, in equal and somewhat opposite directions, from opposed laterally extending sides 206, 208, respectively, of the central planar rectangular section 200. Each edge section, e.g., 202, and two oppositely angled adjustment slots 210, 212 penetrating the outermost laterally extending side 214 of the edge section 202, with each adjustment slot, e.g., 210, located adjacent an associated disk bearing assembly, e.g., 112. Each adjustment slot, e.g., 210, penetrates the laterally extending side 214 extending generally towards, or in the direction of. the axial center of the linear bearing 102 and at a 75 degree angle A1 to the laterally extending side 214. Angle A1 may be other than 75 degrees and from 15 to 170 degrees.

Adjacent pairs of parallel, laterally extending edge sections, e.g., 202, 216, cooperatively support bearing assemblies, e.g., 112, 114, respectively mounted in opposed ends, e.g., 217, 219, in the adjacent edge sections, e.g., 202. Consequently, adjacent pairs of parallel adjustment slots, e.g., 210, 218, may be penetrated with a suitable leverage tool (not shown) to abut the bottom sections 220, 222 of the mating, parallel slots 210, 218 and apply force to the opposite side ends 224, 226 of the slots and urge the associated adjacent disk bearing assembly 112 and adjacent mounting area 228 toward the tube 100 mounted within the linear bearing 102.

In one embodiment of the linear bearing 102, the height H1 of the side plate 106 is 6 inches, the overall width W1 of the side plate 106 is 4 inches, and the width W2 of the central rectangular section is 2.625 inches. Obviously, the size of the side plate 106 and all other components, channels, and slots can vary depending on the size, weight, and orientation of the tube or rod to be slidably mounted within, and supported by, the linear bearing and the amount of support the linear bearing should provide in the particular use and system involved.

Figure 3:
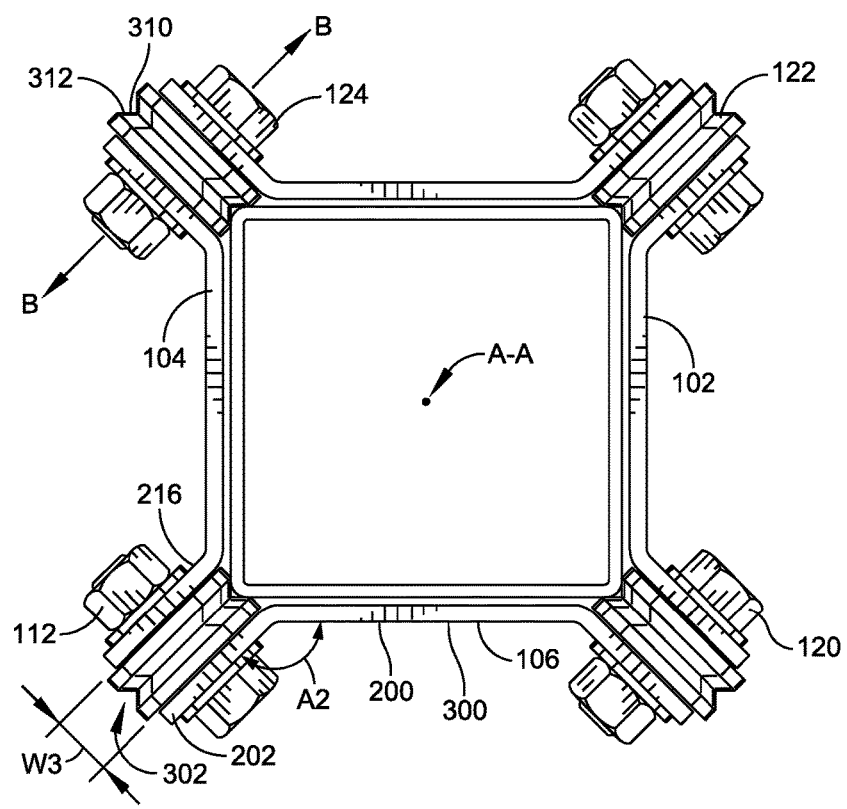
FIG. 3 is a plan view of the grooved linear bearing and square metal tube of FIG. 1.

With reference now to FIG. 3, each set of four bearing assemblies, e.g., 112, 120, 122, 124 are equidistant from the central bearing axis A-A and from each other within the square linear bearing. In addition, the V-peak, e.g., 310, in each V-groove, e.g., 312, in each bearing assembly, e.g., 124, extends radially inwardly toward the axis B-B of the bearing assembly 124.

Each edge section, e.g., 216, in each side plate, e.g., 106, extends at a 45 degree angle A2 to the planar outer surface 300 of the planar central rectangular section 200 in the plate, e.g., 106. The width W3 of the disk bearing mounting slot 302 intermediate the adjacent edge sections 202, 216 in the adjacent side plates 104, 106, is 0.4375 inches.

Figure 4:
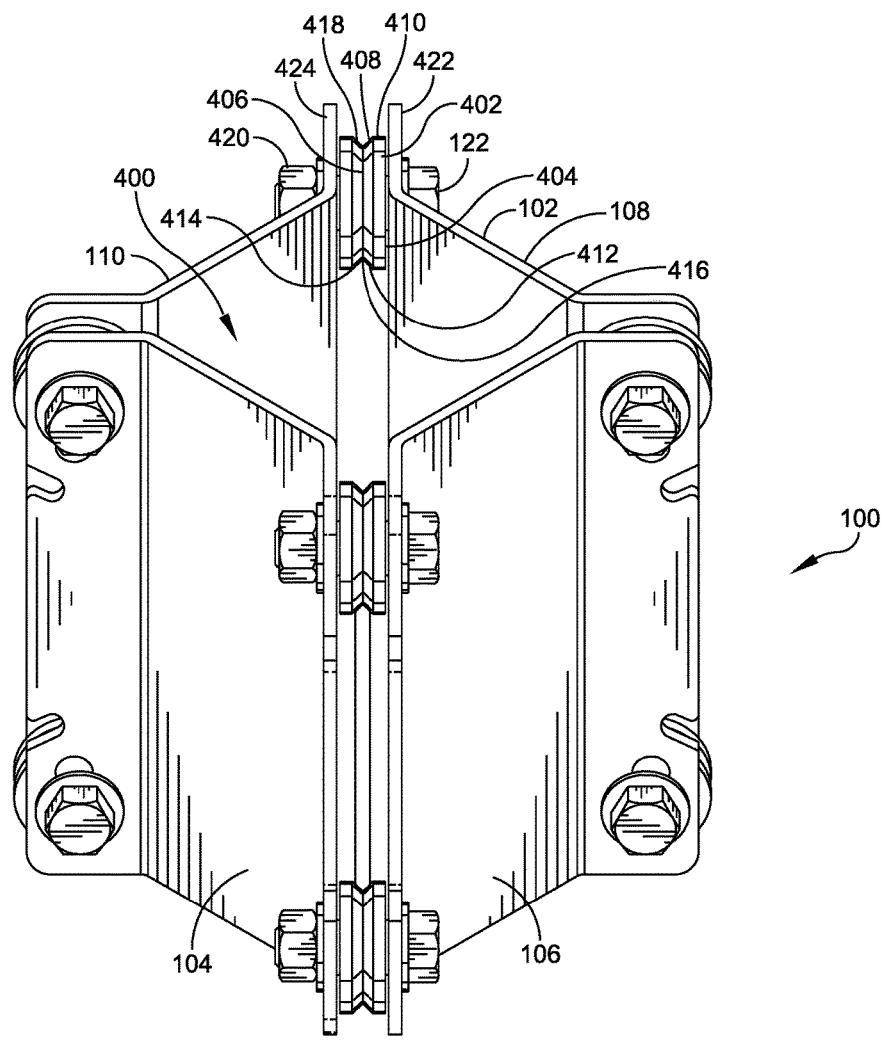
FIG. 4 is a perspective view of the grooved linear bearing of FIG. 1 without the square metal tube mounted within the bearing.
Figure 5:
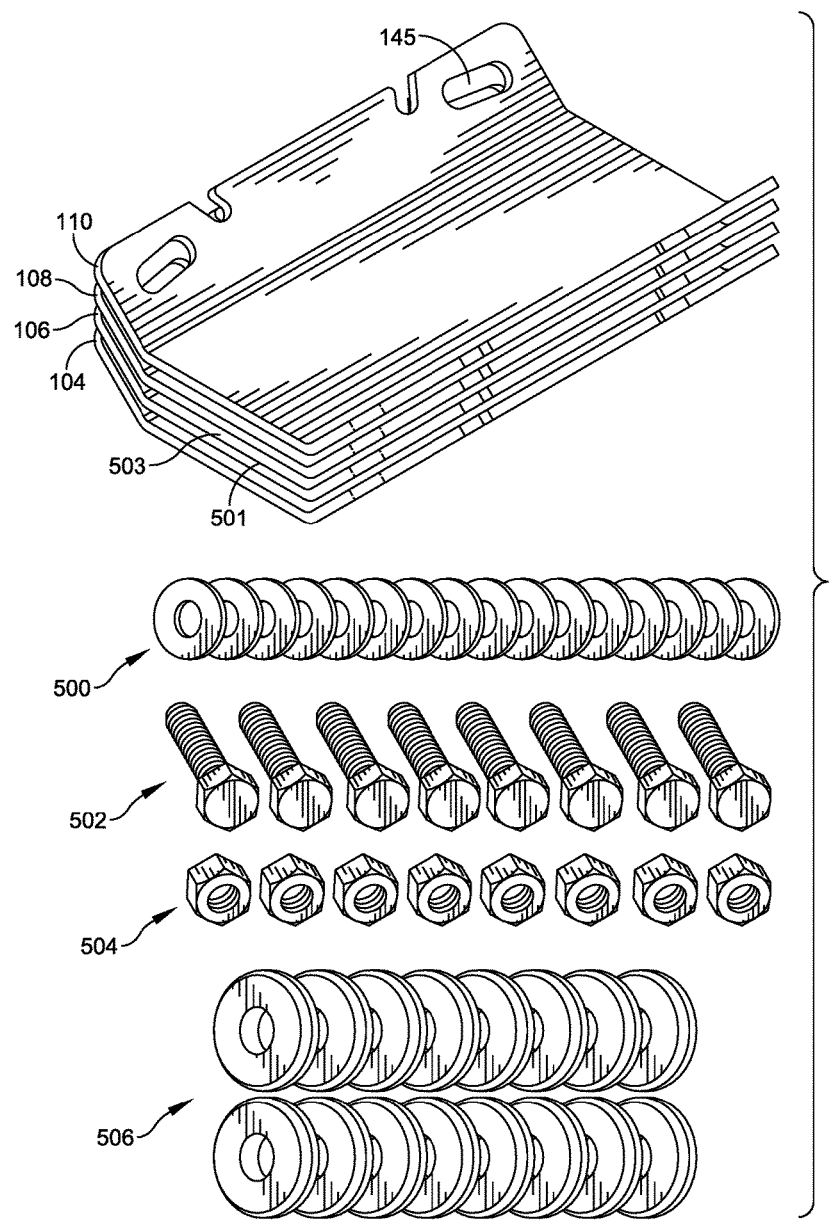
FIG. 5 is a perspective view of all the components of the grooved linear bearing of FIG. 4 prior to assembly, or after disassembly, of the bearing.

With reference now to FIG. 4, the linear bearing 102 provides a four sided tube or rod channel 400 extending laterally within the linear bearing 102 along its lateral length. Referring to both FIGS. 4 and 5, the linear bearing 102 can be easily assembled from, or disassembled into, a set of four stackable side plates 104, 106, 108, 110 (i.e., with one on top of the other and with the upper surface, e.g., 501, of one side plate, e.g., 106, abutting the lower surface, e.g., 503, of the adjacent side plate, e.g., 108), sixteen identical washers, generally 500, eight identical bearing bolts, generally 502, eight identical bolt nuts, generally 504, and sixteen identical bearing disks, generally 506. Each of the side plates, e.g., 110, has a bowl or cup shaped cross-section.

With reference back to FIG. 4, each bearing disk, e.g., 402, has a planar outer disk surface 404 spaced from a planar inner disk surface 406 with a circumferential angled edge section 408 extending at a 45 degree angle radially inwardly from the outermost circumferential edge 410 on the bearing disk 402. Each V-groove disk bearing, e.g., 412, thus consists of opposed bearing disks 402, 414 matingly abutting each other to cooperatively provide a V-groove depression 416 in the overall outer circumferential edge 418 of the mating bearing disks 402, 414.

Each disk bearing assembly, e.g., 122, is thus secured in position between adjacent side plates 108, 110 by the associated bearing bolt 420 penetrating angled bolt mounting channels (not shown in FIG. 4) in the opposed side plate edge end sections 422, 424, respectively, in the adjacent plates 108, 110, respectively, transverse to planar surfaces of the opposed edge end sections 422, 424. Tightening the bolt nut 426 on the bear bolt 420 causes the associated bearing assembly 122 to tighten in position in angled bolt mounting channels in the opposed edge end sections 422, 424. The disk bearing assemblies, e.g., 122, and side plates, e.g., 110, thus cooperatively provide a unitary linear disk bearing 100.

Referring back to FIG. 5, the rigid plates, e.g., 110, are formed of 0.125 inch thick steel plate. All other components 500, 502, 504, 506 are similarly rigid and made of metal. The linear bearing's components 104, 106, 108, 110, 500, 502, 504, 506 collectively weigh 5.125 lbs. and can be packaged in a relatively small package with the side plates stacked on each other. Alternatively, a number of the linear bearings can be packages in a larger, but still relatively small package with the side plates of all the linear bearings stacked on each other. The packaging can be made even smaller by sleeve packaging the washers and the bearing discs (respectively) stacked one on top of the other in the respective sleeves.

The bolt channel 145 is angled toward, as shown in FIG. 2, the axis A-A of the linear bearing 102. With reference to FIGS. 1 and 2, the central bolt of a given bolt assembly, e.g., 145, can thus be moved within its associated the bolt channel 145 toward or away from the linear bearing's axis A-A and thus toward or away from the square tube 100.

Figure 6:
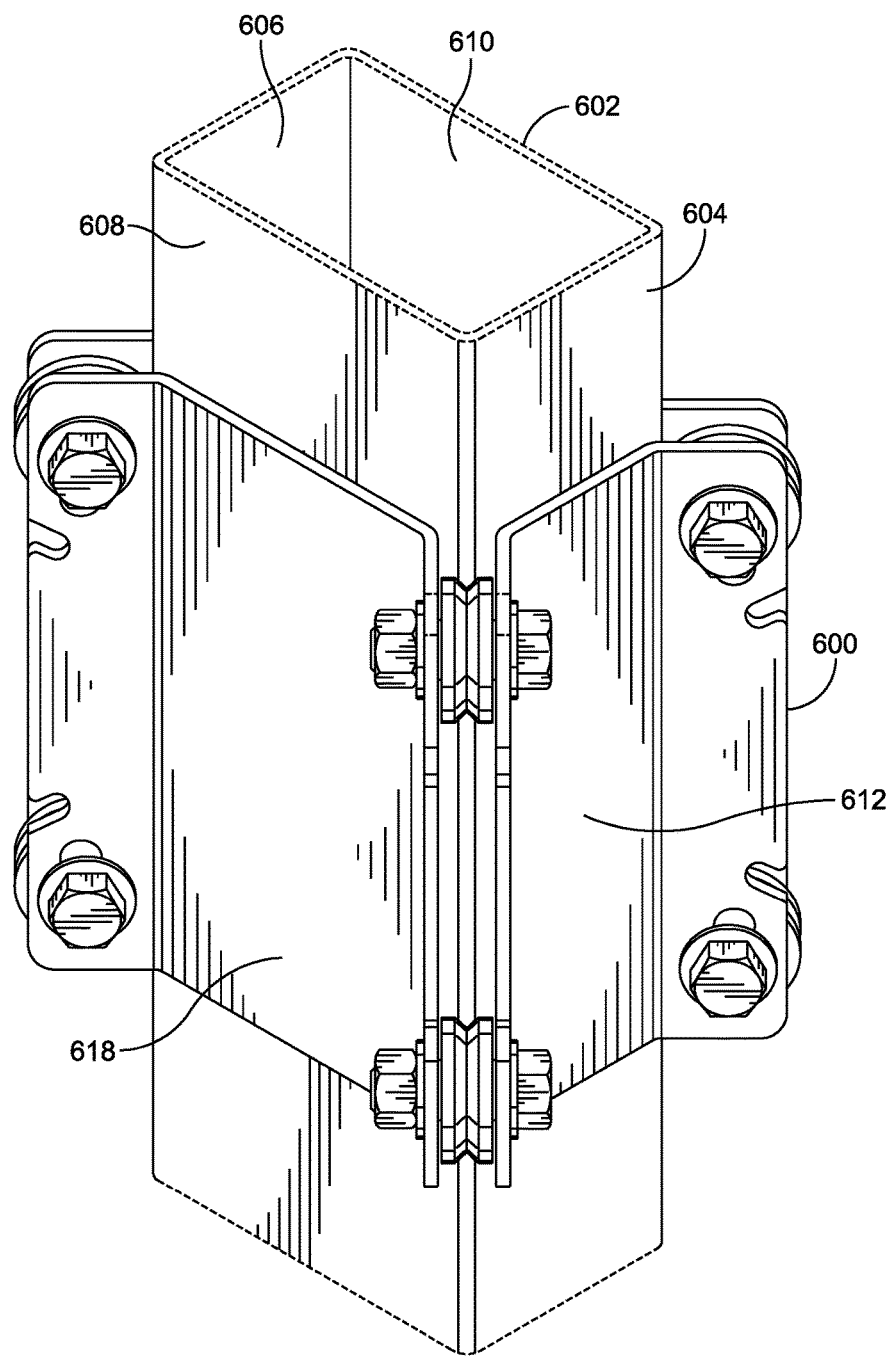
FIG. 6 is a perspective view a grooved linear bearing having two pairs of identically-formed and identically-shaped side plates and two sets of four V-grooved bearing assemblies mounted spaced from each other, with each set adjacent a lateral end of the linear bearing to rigidly support and locate a heavy duty rectangular metal tube slidably mounted with the linear bearing.
Figure 7:
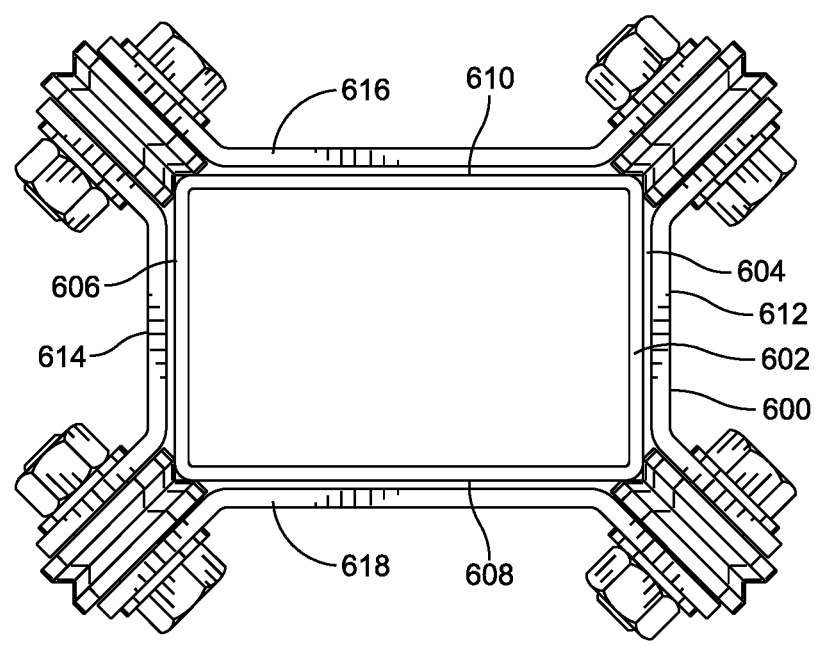
FIG. 7 is a plan view of the grooved linear bearing and rectangular metal tube of FIG. 6.

With reference now to FIGS. 6 and 7, an alternative rectangular linear bearing 600 has a rectangular tube 602 securely, slidably supported and positioned within the rectangular linear bearing 600. The rectangular tube 602 has opposed laterally extending narrower rectangular side sections 604, 606 intermediate opposed, laterally extending wider rectangular side sections 608, 610. Similarly, the rectangular linear bearing has matingly opposed, laterally extending narrower rectangular side sections 612, 614 intermediate opposed, laterally extending wider rectangular sides 616, 618. The rectangular linear bearing 600 is otherwise composed of other components identical to those identified above for the square linear embodiment of FIG. 105 except that each set of four bearing assemblies are not equidistant from the central bearing axis extending laterally through the depicted rectangular linear bearing.

Figure 8:
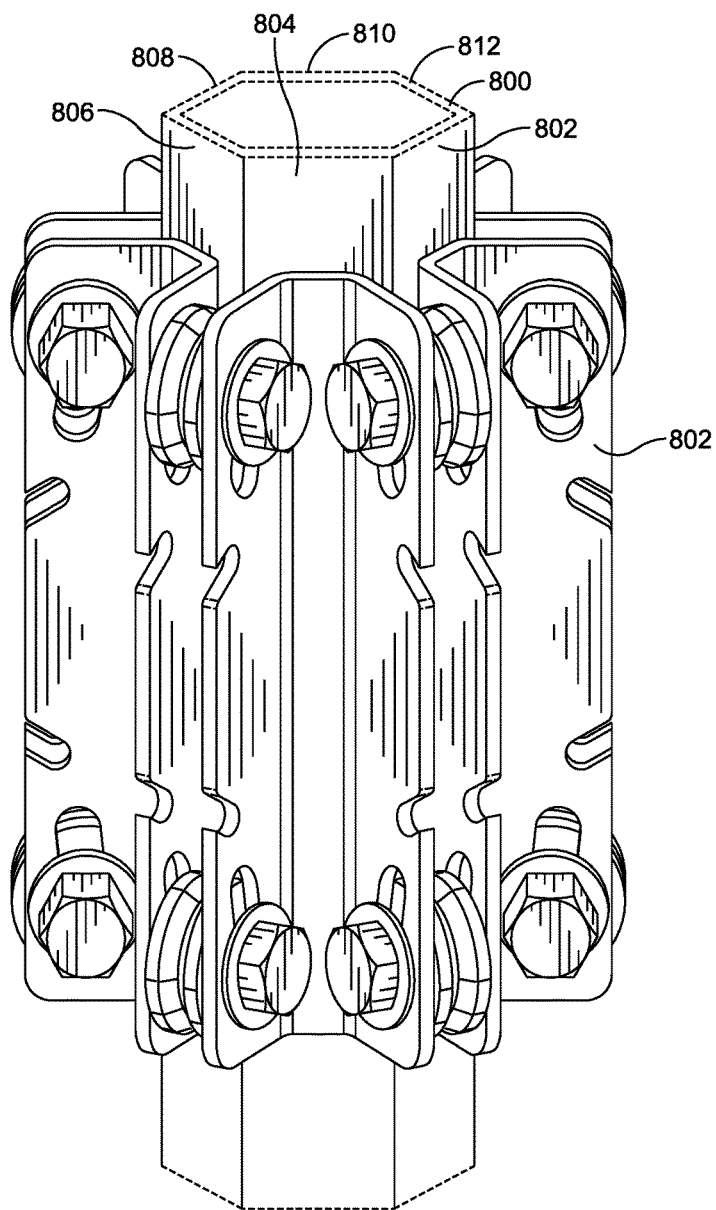
FIG. 8 is a perspective view of a hexagonal grooved linear bearing having six identically-formed and identically-shaped side plates and two sets of six V-grooved bearing assemblies mounted spaced from each other, with each set adjacent a lateral end of the linear bearing to rigidly support and locate a heavy duty hexagonal metal tube slidably mounted with the linear bearing.
Figure 9:
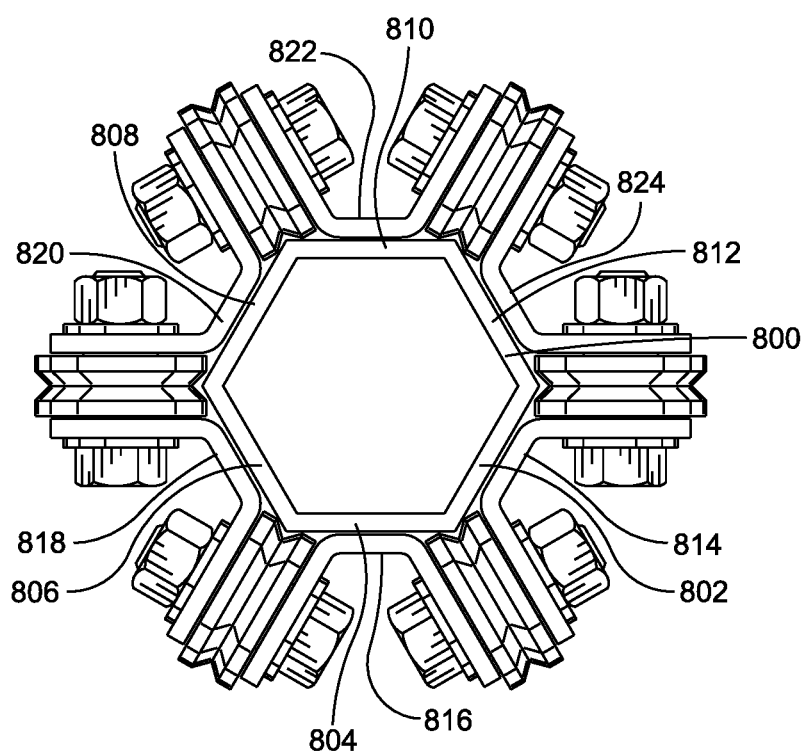
FIG. 9 is a plan view of the hexagonal grooved linear bearing of FIG. 10.

With reference now to FIGS. 8 and 9, an alternative hexagonal linear bearing 800 has a hexagonal tube 802 securely, slidably supported and positioned within the hexagonal linear bearing 600. The hexagonal tube 602 has six identically-shaped, laterally-extending rectangular sides 802, 804, 806, 808, 810, 812. Similarly, the hexagonal linear bearing has six matingly opposed identically-shaped, laterally-extending rectangular side sections 814, 816, 818, 820, 822, 824. The hexagonal linear bearing 800 is otherwise composed of other components identical to those identified above for the square linear embodiment of FIG. 105, and the angle between a given hexagonal side plate's central rectangular plate section and its adjacent laterally extending edge is 30 degrees.

Embodiments of the depicted and other (not necessarily all) disclosed linear bearing embodiments of this specification can be securely mounted to other structure to provide exceptional rotational and side-to-side stability for matingly configured tubes or rods slidably mounted within them. Similarly, multiple such embodiments can be utilized to provide further slidable support as desired.

The depicted embodiments include only two sets of spaced-apart disk bearings, with each set including a V-groove circumferential depression for each corner of the tube or rod to be mounted within the linear bearing. One or more additional sets of spaced-apart disk bearings could be provided in a single linear bearing.

Each set of disk bearings at a given lateral location along the bearing axis, could also include less disk bearings than the number of tube or rod corners or edges. For example, one such embodiment of a rectangular linear bearing can have (i) two opposed disk bearings in one bearing set for position in the linear bearing to abut two opposed corners in a rectangular tube or rod and (ii) two disk bearings in another bearing set in position in the linear bearing to abut the other set of opposed corners in the rectangular tube or rod. As another example, a set of disk bearings could include only one disk bearing for abutting only one corner in the rectangular rod or tube.

The depicted embodiments have disk bearing assemblies each formed of matingly opposed bearing disks. Other types of V-groove bearings may be use, and groove depression may be shaped other than in a V-shape. For example, the circumferential groove depression could be entirely or partially rounded, and optionally the differing depression shape could conform more matingly to a corner or edge on an associated tube or rod with which the linear bearing is to be utilized.

The described components of the depicted embodiments are made of metal. One or more of any such components, or others used to provide a given structure and function, could be made of other materials, such as one or more of plastic or composite material, depending on the application, cost objectives, desired weight, desired useful life, etc.

The depicted embodiments all have side plates including rectangular central sections. The central sections could be configured otherwise depending on the application(s) that may be involved or to provide that the linear bearing can be used in a wider range of applications. For example, a given rod or tube could have tubular outer periphery with one or more laterally extending edges projecting outwardly from the tube or rod tubular section. The central sections can be rounded or angled to accommodate the outer tubular periphery and reduce or eliminate contact between the central sections and such tubular periphery.

The depicted embodiments have side plates, and side plate sections, that are generally planar and with relatively minimal material removed such as to reduce the amount of metal or other material used to form the side plates. The side plates can be structured otherwise to reduce the amount of material and weight of the linear bearing or bearing kit. For example, the rectangular section or edge section of a side plates could both, or one or the other, include one or more circular passages to reduce either or both of the amount of material used to provide, and the weight of the, side plate.

Differently configured bearing disk mounting structure may be utilized. For example, the depicted bearing bolts are threaded from the bold head to the opposed end of the bolt. Alternatively for example, one or more of the bolts may have a non-treaded section intermediate the bold head and a threaded section on the bolt. Such a configuration could also provide an abutment—the non-threaded section—that prevents the bolt nut from threading further along the bolt toward the bolt head. Such a feature can ensure that the bolt nut is not tightened too much to prevent sufficiently free rotation of the disk bearing intermediate the bolt head and bolt nut.

The disclosed embodiments may or may not include of lubricants or temporarily or permanently lubricated surfaces. One or more such lubricants may be included depending on the application.

The depicted embodiments utilize one washer between the bolt head and its adjacent side plate edge section, and one washer between the bolt nut and its adjacent side plate section. Further washers may be beneficially mounted between one or both sides of a disk bearing.

Each depicted disk bearing assembly utilizes a single bolt nut to secure the bolt assembly in position. Multiple bolt nuts may be utilized in a disk bearing assembly in order to lock together in a desired position along the length of the associated bearing bolt. Similarly, one or more lock nuts may be used rather than conventional bolt nuts.

All dimensions and angles disclosed above can be varied for varying circumstances, uses, and objects. The numerical dimensions may be varied to as small as practical for a given application to as large as needed, by 1000 percent larger as but one example. Similarly, the components described and/or illustrated herein are given by way of example only and may be varied as desired.

The foregoing detailed description has described some specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to thereby enable others skilled in the art to best utilize the present systems, their components, and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The subject matter recited in the claims is not coextensive with and should not be interpreted to be coextensive with any embodiment, feature, or combination of features described or illustrated in this document. This is true even if only a single embodiment of the feature or combination of features is illustrated and described in this document for a given element.

What is claimed is:

1. A linear bearing apparatus comprising in combination:
    at least a first, a second, and a third side plate parallel to, and spaced from, a bearing axis extending laterally along the linear bearing apparatus;
    a first disk bearing set of at least a first and a second rotatable disk bearing, the first disk bearing set being mounted about a first bearing axis location along the bearing axis, with each among the at least first and second disk bearings being rotatably mounted intermediate two among the first, second, and third side plate;
    a second disk bearing set of at least a third and a fourth rotatable disk bearing, the second bearing set being mounted about a second location along the bearing axis spaced from the first bearing axis location with each among the third and fourth disk bearings being rotatably mounted intermediate among two of the first, second, and third side plate;
    wherein each disk bearing has a disk body having:
        (i) a central tubular rod passage passing through the center of the disk body and having a central rod passage axis extending along the lateral length of the central tubular rod passage transverse to the bearing axis; and
        (ii) an outer circumferential edge coaxial with the rod passage axis and having a circumferential depression having a circumferential depression peak in a peak plane transverse to the bearing axis.

2. The linear bearing apparatus of claim 1 wherein the first and second rotatable disk bearings are spaced from the first bearing axis location and rotatable in a first bearing set plane transverse to the bearing axis and the third and fourth rotatable disk bearings are spaced from the first bearing axis location and rotatable in a second bearing set plan transverse to the bearing axis.

3. The linear bearing apparatus of claim 1 wherein each of the first, second, and third side plates has a rectangular central plate section with a first plate edge opposite a second plate edge and the first plate edge and second plate edge extend laterally parallel to the bearing axis.

4. The linear bearing apparatus of claim 3 wherein each of the first plate edge and second plate edge extend from the rectangular plate section in opposite directions at an obtuse angle to the plane of the rectangular plate section.

5. The linear bearing apparatus of claim 4 wherein each disk bearing is rotatably mounted about a bearing rod mounted to opposed plate edges extending from two adjacent side plates among the first, second, and third side plates.

6. The linear bearing apparatus of claim 5 wherein at least one among the first, second, and third side plates has two angled bearing rod mounting channels, each angled bearing rod mounting channels having one channel end opposite a second channel end, with the first channel end closer than the second channel end to the bearing axis.

7. The linear bearing apparatus of claim 6 wherein at least one among the first, second, and third side plates has two angled rod bearing adjustment slots penetrating the outer edge of the at least one among the first, second, and third side plates, each angled rod bearing adjustment slot having an open slot end opposite a closed slot end, with the open slot end closer than the closed slot end to the bearing axis.

8. The linear bearing apparatus of claim 7 wherein the circumferential depression is a V groove and the circumferential depression peak is a V groove peak.

9. The linear bearing apparatus of claim 1 wherein at least one among the first, second, and third side plates has two angled bearing rod mounting channels, each angled bearing rod mounting channel having one channel end opposite a second channel end, with the first channel end closer than the second channel end to the bearing axis.

10. The linear bearing apparatus of claim 1 wherein at least one among the first, second, and third side plates has two angled rod bearing adjustment slots penetrating the outer edge of the at least one among the first, second, and third side plates, each angled rod bearing adjustment slot having an open slot end opposite a closed slot end, with the open slot end closer than the closed slot end to the bearing axis.

11. The linear bearing apparatus of claim 8 also including at least a fourth side plate parallel to, and spaced from, the bearing axis, and wherein the first disk bearing set and the second disk bearing set each include four rotatable disk bearings with each of the four rotatable disk bearings mounted at one of four corners of a rectangular bearing channel laterally extending along the bearing axis and surrounded by the first, second, third, and fourth side plates.

12. The linear bearing apparatus of claim 11 also including a rectangular rod having central rod axis extending along the lateral length of the rod, a rectangular cross-section transverse to the central rod axis, and four outer rectangle corners, the rectangular rod slidably mounted within the rectangular bearing channel with each of four outer rectangle corners slidably abutting the V groove in one disk bearing among each of the first bearing set and the second bearing set.

13. The linear bearing apparatus of claim 1 wherein the circumferential depression is a V groove and the circumferential depression peak is a V groove peak.

14. The linear bearing apparatus of claim 13 also including at least a fourth side plate parallel to, and spaced from, the bearing axis, and wherein the first disk bearing set and the second disk bearing set each include four rotatable disk bearings with each of the four rotatable disk bearings mounted at one of four corners of a rectangular bearing channel laterally extending along the bearing axis and surrounded by the first, second, third, and fourth side plates.

15. The linear bearing apparatus of claim 14 also including a rectangular rod having central rod axis extending along the lateral length of the rod, a rectangular cross-section transverse to the central rod axis, and four outer rectangle corners, the rectangular rod slidably mounted within the rectangular bearing channel with each of four outer rectangle corners slidably abutting the V groove in one disk bearing among each of the first bearing set and the second bearing set.

16. The linear bearing apparatus of claim 1 also including at least a fourth side plate parallel to, and spaced from, the bearing axis, and wherein the first disk bearing set and the second disk bearing set each include four rotatable disk bearings with each of the four rotatable disk bearings mounted at one of four corners of a rectangular bearing channel laterally extending along the bearing axis and surrounded by the first, second, third, and fourth side plates.

17. A linear bearing apparatus kit of the type for slidably supporting a polygonal rod within a linear bearing assembled from the kit components, the linear bearing apparatus kit comprising in combination:
a plurality of rotatable disk bearings, each having a disk body section with opposed planar disk surfaces, a bolt passage in the axial center of the disk body section transverse to the opposed planar disk surfaces, and at least one angled circumferential edge having a circumferential edge surface at an acute angle to the planar disk surfaces;
a plurality of disk bearing bolts, each being mountable in a bolt passage in at least one among the plurality if disk bearings;
a plurality of bolt nuts threadable on at least one among the plurality of disk bearing bolts; and
at least a first, a second, and a third stackable side plate, each having:
(i) a rectangular central plate section with a first plate edge opposite a second plate edge, the first plate edge and second plate edge extending from the rectangular plate section in opposite directions at an obtuse angle to the plane of the rectangular plate section; and
(ii) a bowl shaped cross-section with an outer cup surface and inner cup surface, whereby the first stackable side plate is matingly stackable to the second stackable side plate and the second stackable side plate is matingly stackable to the third stackable side plate with the first, second, and third side plate forming a side plate stack.

18. The linear bearing apparatus kit of claim 17 wherein the plurality of disk bearings includes at least four disk bearing bolts and four bolt nuts, the bearing disks sufficient to provide four rotatable disk bearings, each having a V-shaped outer circumferential edge with a V-peak extending radially inwardly from opposed V arms forming the V-shaped outer circumferential edge.

19. The linear bearing apparatus kit of claim 18 also including a plurality of bolt mountable washers, the number of bolt mountable washers being at least double the number of disk bearing bolts.

20. The linear bearing apparatus kit of claim 18 wherein each rotatable disk bearing is cooperatively providable by one bearing disk mountable about a bearing bolt to abut a second bearing disk.

21. The linear bearing apparatus kit of claim 17 also including a plurality of bolt mountable washers, the number of bolt mountable washers being at least double the minimum number of disk bearing bolts required to assemble the linear bearing kit of the linear bearing apparatus kit.

22. The linear bearing apparatus kit of claim 21 wherein each disk bearing bolt bearing is cooperatively providable by one bearing disk mountable about a bearing bolt to abut a second bearing disk.

23. A linear bearing apparatus of the type for slidably supporting a polygonal rod within the linear bearing apparatus, the linear bearing apparatus comprising in combination:
at least three side plates, each having a rectangular central section surrounding a linear bearing axis extending through the length of the linear bearing;
two sets of rotatable disk bearing components, the first set of rotatable disk bearing components being mountable to provide a first plurality of disk bearings mounted to the three side plates about the linear bearing axis in a first disk bearing rod axis plane transverse to the linear bearing axis at a first linear axis location, the second set of rotatable disk bearing components being mountable to provide a second plurality of disk bearings mounted to the three side plates about the linear bearing axis in a second disk bearing rod axis plane transverse to the linear bearing axis at a second linear axis location, the first linear axis location being spaced from the second linear axis location, each said disk bearing having a V-shaped circumferential edge with a V-peak extending radially inwardly from opposed V arms forming the V-shaped outer circumferential edge.

24. The linear bearing apparatus of claim 23 wherein each said disk bearing is comprised two mating bearing disks, each having (i) a central disk section having opposed planar disc surfaces, (ii) a center bearing bolt passage transverse to the planar disk surfaces, and (iii) an angled circumferential edge intermediate and surrounding the planar disk surfaces at an acute angle to the planar disk surfaces, the V-shaped circumferential edge being cooperatively providable by opposed angled circumferential edges in opposing bearing disks.

25. The linear bearing apparatus of claim 24 having (i) at least four side plates and (ii) each set of rotatable disk bearings comprises four disk bearings.

26. The linear bearing apparatus of claim 23 having (i) at least four side plates and (ii) at least one set of rotatable disk bearings comprises four disk bearings.

* * * * *